US011228591B2

(12) United States Patent
Karunakaran et al.

(10) Patent No.: US 11,228,591 B2
(45) Date of Patent: Jan. 18, 2022

(54) CORRELATING MOBILE DEVICE AND APP USAGE WITH CLOUD SERVICE USAGE TO PROVIDE SECURITY

(71) Applicant: MOBILEIRON, INC., Mountain View, CA (US)

(72) Inventors: Kumara Das Karunakaran, Milpitas, CA (US); Vijay Pawar, Palo Alto, CA (US)

(73) Assignee: MOBILEIRON, INC., Mountain View, CA (US)

( * ) Notice: Subject to any disclaimer, the term of this patent is extended or adjusted under 35 U.S.C. 154(b) by 646 days.

(21) Appl. No.: 15/937,617

(22) Filed: Mar. 27, 2018

(65) Prior Publication Data

US 2018/0288045 A1    Oct. 4, 2018

Related U.S. Application Data

(60) Provisional application No. 62/478,081, filed on Mar. 29, 2017.

(51) Int. Cl.
| | |
|---|---|
| *H04L 29/06* | (2006.01) |
| *H04W 12/06* | (2021.01) |
| *H04W 12/08* | (2021.01) |
| *H04W 12/37* | (2021.01) |
| *H04W 12/67* | (2021.01) |

(52) U.S. Cl.
CPC ...... *H04L 63/0876* (2013.01); *H04L 63/0853* (2013.01); *H04L 63/101* (2013.01); *H04L 63/205* (2013.01); *H04W 12/06* (2013.01); *H04W 12/08* (2013.01); *H04W 12/37* (2021.01); *H04L 63/166* (2013.01); *H04W 12/67* (2021.01)

(58) Field of Classification Search
CPC . H04L 63/0876; H04L 63/205; H04L 63/101; H04L 63/0853; H04L 63/166; H04W 12/08; H04W 12/0027; H04W 12/06; H04W 12/00505
See application file for complete search history.

(56) References Cited

U.S. PATENT DOCUMENTS

| | | | |
|---|---|---|---|
| 8,340,633 B1 | 12/2012 | Rege | |
| 2010/0281388 A1* | 11/2010 | Kane | H04L 43/045 715/736 |
| 2012/0023221 A1 | 1/2012 | Dayan | |
| 2014/0020072 A1 | 1/2014 | Thomas | |

(Continued)

FOREIGN PATENT DOCUMENTS

WO    WO-03094000 A2 * 11/2003    .......... G06F 11/3495

*Primary Examiner* — Michael R Vaughan
(74) *Attorney, Agent, or Firm* — Van Pelt, Yi & James LLP (57) ABSTRACT

Techniques to provide secure access to a cloud service are disclosed. In various embodiments, enterprise mobility management (EMM) data associated with a set of enterprise users of mobile devices associated with an enterprise is received. Cloud service data associated with use of a cloud service of the cloud service provider by users associated with the enterprise is received and correlated with the EMM data. Usage of the cloud service by said users associated with the enterprise is analyzed, including one or both of access of the cloud service using one or more unmanaged devices and access of the cloud service using one or more unmanaged mobile apps.

23 Claims, 7 Drawing Sheets

(56) References Cited

U.S. PATENT DOCUMENTS

| | | | | |
|---|---|---|---|---|
| 2014/0137246 A1* | 5/2014 | Baluda | G06F 21/568 |
| | | | 726/22 |
| 2014/0196150 A1* | 7/2014 | Bettini | G06F 16/951 |
| | | | 726/25 |
| 2014/0237545 A1* | 8/2014 | Mylavarapu | H04L 63/1433 |
| | | | 726/3 |
| 2014/0359777 A1* | 12/2014 | Lam | G06F 21/577 |
| | | | 726/25 |
| 2015/0038133 A1* | 2/2015 | Einzig | H04M 1/72463 |
| | | | 455/419 |
| 2018/0191858 A1* | 7/2018 | Jennequin | H04L 12/2818 |

* cited by examiner

CORRELATING MOBILE DEVICE AND APP USAGE WITH CLOUD SERVICE USAGE TO PROVIDE SECURITY

CROSS REFERENCE TO OTHER APPLICATIONS

This application claims priority to U.S. Provisional Patent Application No. 62/478,081 entitled CORRELATING MOBILE DEVICE AND APP USAGE WITH CLOUD SERVICE USAGE TO PROVIDE SECURITY filed Mar. 29, 2017 which is incorporated herein by reference for all purposes.

BACKGROUND OF THE INVENTION

Enterprises are moving to Cloud Service Providers (SPs) like Office365, Box, Salesforce, Slack, etc. for their productivity, collaboration and business application workloads. Employees are now using Mobile Applications ("mobile apps") to access these Cloud Services more than the traditional desktop browsers. This exposes sensitive enterprise data to these mobile apps. Unlike traditional desktop and other computers, which are managed and typically owned by the corporation, mobile devices are typically owned by the employee (e.g., "bring your own device" or BYOD). Even when the mobile device is managed by the Enterprise using an Enterprise Mobility Management (EMM) solution like that of MobileIron®, the applications that the employee uses to access the Cloud Services may not be a "sanctioned" application. Most of the Cloud Services are exposing APIs for any developer to develop applications and there is an ecosystem of apps that are available with each of these services. Salesforce AppExchange™ is an example. This means that in addition to the "official" app from these cloud service providers, one can find a plethora of apps developed by any unknown individuals or vendor that are written against one or multiple of these cloud service providers in the mobile application store (e.g., iTunes, Google Play, or other app store). An employee may pick any of these apps to access the corporate managed account on these Cloud Service Providers. Typically, an Enterprise has no easy way to determine which apps are in use by which user and what data is being downloaded from the cloud service to the mobile devices. Further these unsanctioned apps may be exposing corporate data to 3rd party cloud services, which may put the enterprise at a high risk.

There are existing solutions for the desktop space provided by CASB (Cloud Access Security Broker) vendors. These however are targeted in identifying which cloud services are being used by the employees in an enterprise. They ignore the end point—specifically the mobile end points—in their discovery approach. Their focus is on the cloud service.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Providing security at least in part by correlating mobile device and/or mobile app usage data with cloud service usage data is disclosed. In various embodiments, usage and/or other reports and logs generated by an Enterprise Mobility Management (EMM) solution are correlated with usage (e.g., audit) logs and/or other contextual data (e.g., all associated devices/login sessions for a user) provided by a Cloud Service Provider, sometimes referred to herein collectively as "cloud service data", to provide security. In some embodiments, mobile device and/or mobile app usage data is analyzed with associated cloud service data to identify instances in which an enterprise user accessed the Cloud Service using an unmanaged mobile device, e.g., a device not under management of an EMM solution used by the enterprise, and/or an unmanaged mobile app. Unmanaged apps may be assessed to determine a degree of concern or risk associated with such use. An extent of use of unmanaged devices, unmanaged apps, and/or apps associated with heightened risk may be analyzed across the enterprise, e.g., across users of the enterprise, and a dashboard, report, or other presentation of information may be provided.

In various embodiments, data about mobile devices and applications is collected from EMM logs and then compared and correlated with audit logs and contextual data from Cloud Service Providers. In some embodiments, data is correlated across Cloud Service Providers. For example, a higher risk may be assigned to an instance of a same user having an unmanaged device and/or app across multiple service providers; a user accessing different cloud services at or near the same time but from disparate locations; etc. The EMM logs/reports in various embodiments carry a list of one or more of the following: devices managed by the EMM, the user using each device, the list of applications reported by the device, and which of those apps are managed and which are unmanaged. An unmanaged application in a managed device may retain corporate data even after the device is retired from EMM (like when an employee leaves the company). This is risk for the enterprise, just as an application in an unmanaged device can access and retain data.

Most enterprise class Cloud Service Providers provide audit logs and contextual data which contain information such as who logged into the service using which application and from where and at what time, and in some cases with which device. The applications are typically identified by something called an OAuth Identifier. OAuth Identifiers are distributed by the SP to the application vendor. This is used by the SP to get "consent" from the user to allow the application to access the user's data. In some embodiments, a "knowledge database" of how these application identifiers are mapped to mobile (or other) applications (bundle-ids, for example) is built. This mapping may be used to correlate which mobile app on which device was used by which user to access the SP. In some embodiments, a 3rd party App Reputation vendor may be used to classify the identified mobile apps into various categories to assess risk.

In various embodiments, actions may be taken in response to security risks detected at least in part by correlating mobile device and/or mobile app usage data with cloud service usage data, including without limitation one or more of blocking one or more users, blocking one or more apps, migrating one or more users from use of an unmanaged app to use of a managed app, logging out one or more user sessions, providing corrective actions to users via an interaction page, warning the user about an un-approved action they have taken, stepping up authentication (e.g., by asking for another factor), and other actions.

In various embodiments, techniques disclosed herein overcome technical shortcomings of prior solutions. Prior solutions have been very cloud service and user focused assuming that all accesses happen through desktop computers and browsers. Techniques disclosed herein are end-point and application focused and assesses risk based on multiple factors related to end point and application posture. In some embodiments, a loop back system ensures risk can be mitigated and user awareness is improved.

In some embodiments, an application and/or end point focused risk score provides a perspective of how mobile applications pose threats to enterprise data in cloud services and also provide mobile specific risk assessment and remediation.

Figure 1:
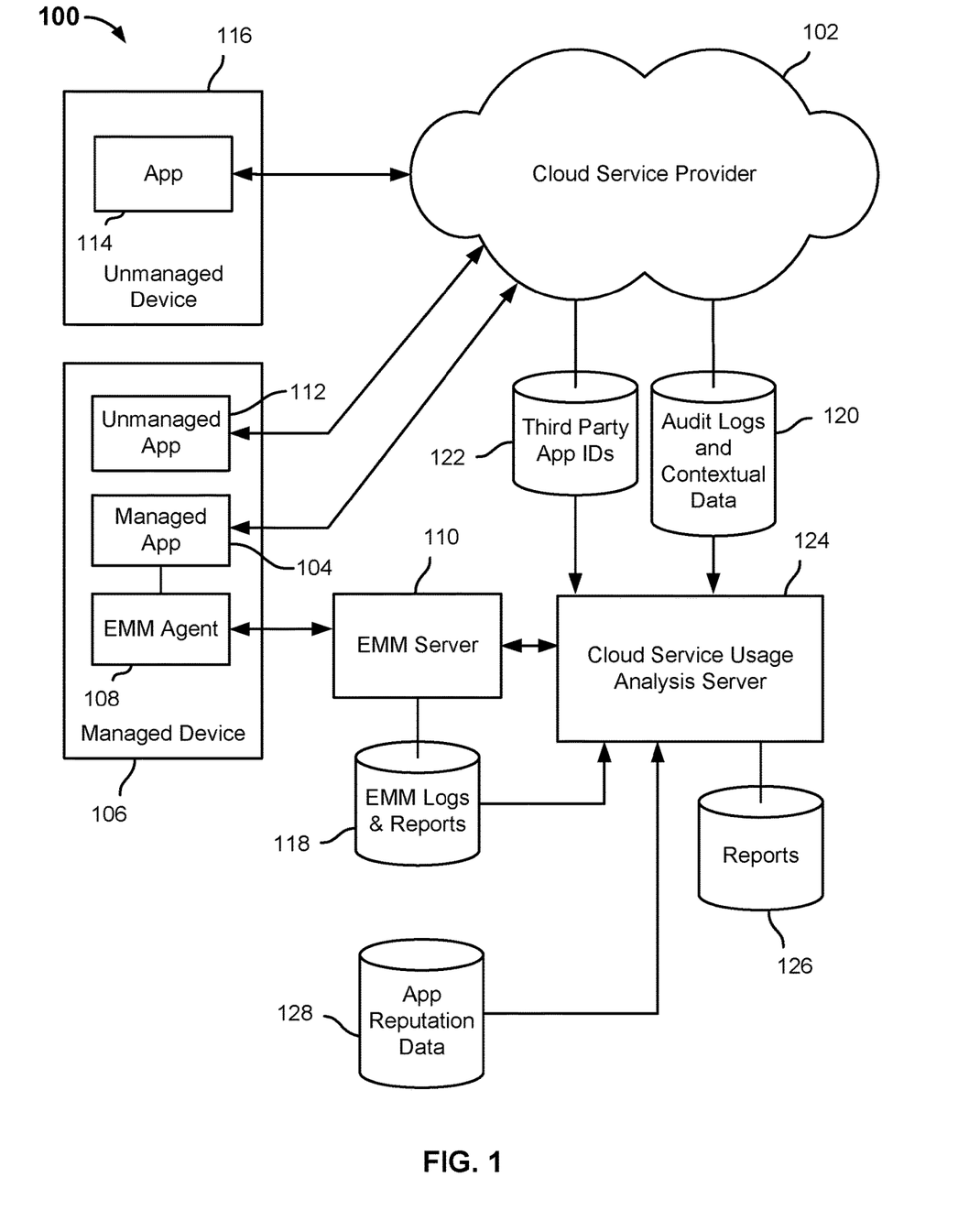
FIG. 1 is a block diagram illustrating an embodiment of a system to provide secure access to a cloud service.

FIG. 1 is a block diagram illustrating an embodiment of a system to provide secure access to a cloud service. In the example shown, the system and environment 100 includes a cloud service provider (SP) 102. A managed app 104 on a managed mobile device 106 (e.g., a smartphone) is configured to access the cloud service 102. The managed app 104 is managed in part by a native or other EMM agent 108 on the device 106. The EMM agent 108 in this example has been brought under management by an EMM solution that includes EMM server 110. In some embodiments, a user of managed device 106, e.g., an employee-owner of the device 106, an enterprise IT administrator, or other authorized user, may have registered the device 106 with the EMM server 110. The EMM server 110 may have brought the device under management by invoking an API or other interface of the EMM agent 108. The EMM server 110 may have used the EMM agent 108 to bring the managed app 104 under management, e.g., by configuring the managed app 104 to access the cloud service 102 in a desired, EMM-managed manner. In some embodiments, the EMM agent 108 may be a component and/or service of the device operating system.

In the example shown, a user of device 106 has installed an unmanaged app 112. The unmanaged app 112 may be a third party app configured to access the cloud service 102. For example, a user of device 106 may be prompted by unmanaged app 112 to enter the user's enterprise credentials (e.g., username and password) to gain access to cloud service 102. Access by an unmanaged app, such as unmanaged app 112, can result in "leakage" of enterprise data to unmanaged and/or undesired locations. For example, an unmanaged mobile app may upload enterprise data to an unmanaged destination, such as a non-enterprise account with a cloud storage service, or an unmanaged app may make enterprise data available to other apps on the device, and/or may store enterprise data in a location and manner that results in such data not being erased in the case of loss or theft of the device, departure of the employee, etc.

The system and environment 100 of FIG. 1 includes an unmanaged app 114 on an unmanaged device 116. An enterprise user may use app 114 on unmanaged device 116 to access enterprise data from cloud service 102, which could result in enterprise data being stored on unmanaged device 116.

In various embodiments, techniques disclosed herein are used to correlate mobile device and app usage data generated by an EMM solution, e.g., EMM server 110, with usage and contextual data generated by one or more cloud service providers, e.g., cloud service provider 102, to assess risk and provide security. In various embodiments, correlated data is used to detect access of enterprise cloud service-based data (or other resources) via unmanaged devices and/or apps.

In the example shown in FIG. 1, EMM server 110 generates and stores EMM logs and reports 118. EMM logs and reports 118 may be stored on a storage device comprising or otherwise associated with EMM server 110 and/or on remote storage devices and/or systems. EMM logs and reports 118 may include one or more of the following: records identifying each enterprise user and that user's enterprise identity, associated device(s), app(s), etc.; records containing data for each managed device, including device type, unique identifiers, installed apps, device location, etc.; and logs of cloud service access activity via managed and/or observed nodes or resources, e.g., via a security gateway or other node associated with EMM server 110, including for each access event an identification of one or more of the user, device, and app involved in the event.

For its part, cloud service 102 generates and stores audit logs 120 reflecting access and other events, and for each such event the user, device, and app involved in the event. In addition, cloud service 102 stores for each third party or other app authorized and configured to be used to access the cloud service 102 a record that includes one or more of an app name, app identifier (e.g., bundle ID), developer name, and/or other information about the app. In some cases, the cloud service may provide contextual information about each device and/or app that a specific user is using Referring further to FIG. 1, in the example shown the system and environment 100 includes a cloud service usage analysis server 124. In some embodiments, the analysis described herein as being performed by cloud service usage analysis server 124 may be performed by a cloud service usage analysis service, which may itself be exposed and provided as a cloud service. While shown as a separate entity in FIG. 1, in some embodiments cloud service usage analysis server 124 may be included in the same physical server/computer and/or logical entity as EMM server 110. In the example shown, cloud service usage analysis server 124 obtains and/or receives data including EMM logs and reports 118, cloud service audit logs and contextual data 120, and third party/other app identifier records 122. In various embodiments, cloud service usage analysis server 124 correlates data from EMM logs and reports 118 with cloud service data included in audit logs and contextual data 120 to generate cloud service usage reports 126. In various embodiments, usage reports 126 may include data indicating and/or summarizing instances of cloud service access using unmanaged devices and/or apps.

In some embodiments, application identifier data/records 122 may be used to correlate cloud service usage data obtained from audit logs 120 with specific apps and/or app instances on specific managed devices and/or to identify (more particularly) an unmanaged app that has been used to access enterprise data (or other resources) via cloud service 102.

In the example shown, cloud service usage analysis server 124 uses third party (or other) app reputation data 128 to assign a degree of risk (e.g., a risk score) to instances of unauthorized access of enterprise data using a given unmanaged app. For example, widespread use across many enterprise users of an unmanaged app that has a low (high risk) reputation score may result in a responsive action to block use of the app, while limited use of an app with a high reputation score may trigger a less immediate or drastic response.

In various embodiments, cloud service usage analysis server 124 may build and include in reports 126 a dashboard or other presentation or representation of enterprise-wide security risk as determined at least in part by correlating EMM mobile device and app usage data with cloud service usage data. Such a dashboard may reflect analyses across enterprise users, groups of users, roles and titles of user, devices, applications, locations, etc., and may span two or more cloud service providers.

Figures 2, 3:
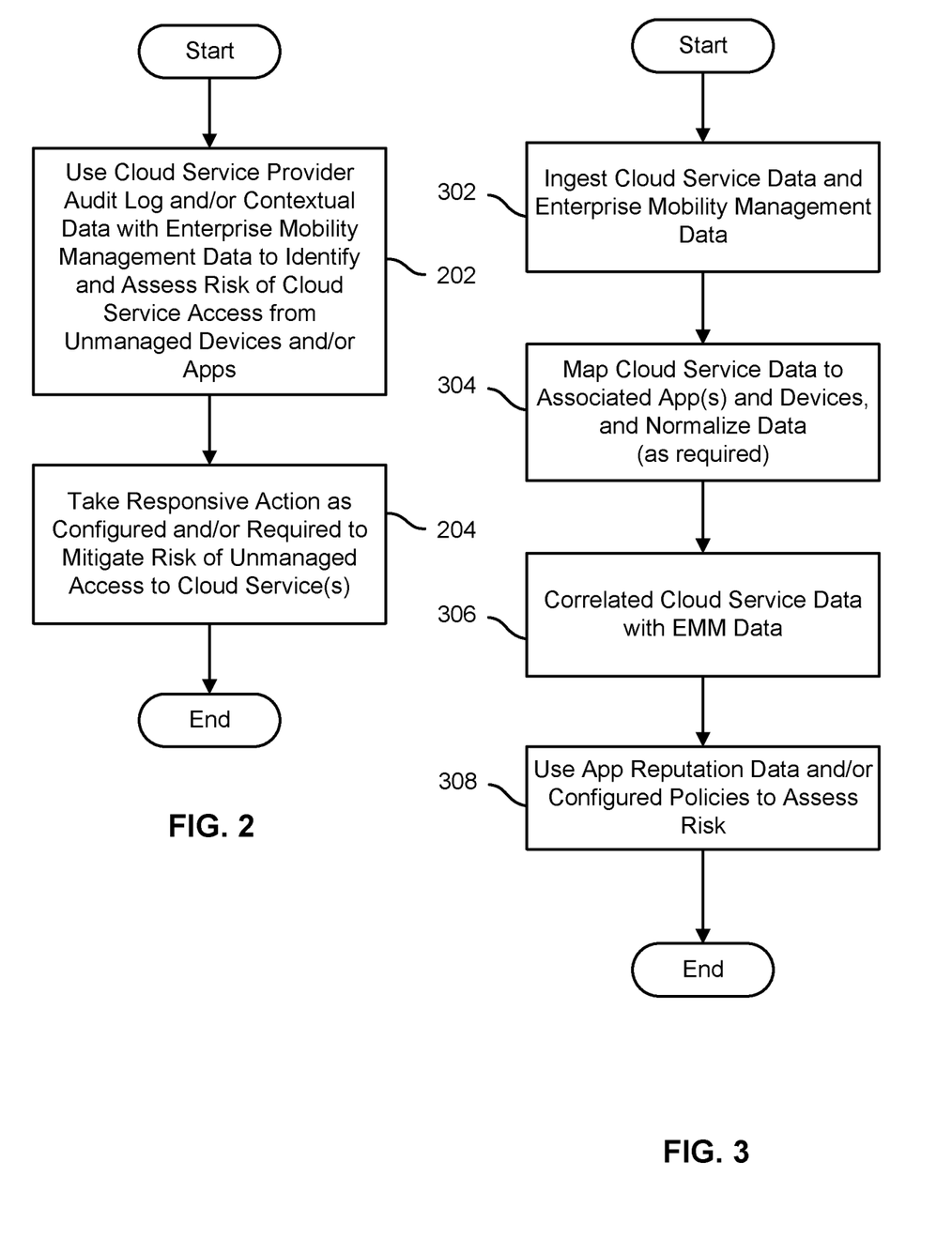
FIG. 2 is a flow chart illustrating an embodiment of a process to provide secure access to a cloud service.
FIG. 3 is a flow chart illustrating an embodiment of a process to provide secure access to a cloud service.

FIG. 2 is a flow chart illustrating an embodiment of a process to provide secure access to a cloud service. In some embodiments, the process 200 of FIG. 2 may be implemented by an analysis server or other computer, such as cloud service usage analysis server 124 of FIG. 1. In the example shown, cloud service provider audit log data is correlated with EMM log and/or report data to identify and assess the security risk associated with instances of accessing enterprise cloud service data or other resources using unmanaged devices and/or apps (202). Responsive action is taken as configured and/or required to mitigate the security risk associated with accessing enterprise cloud service data or other resources using unmanaged devices and/or apps (204).

FIG. 3 is a flow chart illustrating an embodiment of a process to provide secure access to a cloud service. In some embodiments, step 202 of FIG. 2 is implemented at least in part by the process of FIG. 3. Cloud service data, such as audit log and/or contextual data, and EMM log and/or report data are ingested (302). Cloud service data is mapped to associated apps, e.g., based on application bundle or other identifier(s), and/or devices, and is normalized, e.g., to a common schema across cloud service providers and/or other sources (304). The mapped and (if applicable and/or required) normalized cloud service data is correlated with the ingested EMM log and/or report data (306). App reputation data and/or configured policies and/or algorithms are applied to assess risk (308).

In various embodiments, cloud service provider audit logs and/or EMM logs and/or reports may be ingested manually, e.g., by an administrator, and/or automatically, e.g., according to a schedule (302). In some embodiments, when cloud service provider audit logs are uploaded, a "Mapping & Normalization" component uses an "Application Knowledge" and/or "Device Knowledge" database associate with the cloud service, such as third party app ID data store 122 of FIG. 1, to determine which application—mobile or desktop—was granted access to the SP, from which device type (e.g., Android, iOS, or Desktop), and which user logged in. This normalization is performed in some embodiments since different SPs may provide information in non-standard ways and each SP's cloud service data may have different content (304). In various embodiments, mapping and normalization attempts to create a uniform data schema from the raw data. In some embodiments, raw data is correlated by a correlation module, which stores correlated data in a structured manner, such as a database. Data from the SP cloud service data and EMM logs/reports may be correlated based on one or more of application identity (e.g., bundle ID, user agent string, human-readable or otherwise friendly name, etc.) and user (e.g., username, email address, etc.). EMM data may include one or more of user identity, device identity, device disposition (managed/unmanaged), app identity and app disposition (managed/unmanaged), device type (e.g. iOS, Android, iPad, iPhone, Vendor name etc.), in addition to timestamps, location, and/or other information. The EMM data may also include communication-related audit logs from apps to service providers. The correlation module may "join" the data from these two sources and create unified information ready for analysis and reporting.

In various embodiments, correlated data from SP audit logs and EMM logs and/or reports may be analyzed in one or more of the following ways:
  a. Derive the number of users who are using the SP using mobile apps vs. desktop apps;
  b. Identify users who are accessing SP from mobile, but who do not have a device registered with EMM;
  c. Determine the percentage of Users who are using a managed vs. unmanaged device to access an SP using an App;
  d. Determine Apps which are sanctioned (configured in EMM to be managed) vs. unsanctioned for each SP;
  e. Determine the percentage of each Sanctioned App which are managed vs. unmanaged;
  f. Determine the leader board (popularity) of mobile apps;

g. By matching against an App Reputation service, determine the reputation score of these apps to identify malicious or suspicious apps;
h. Determine Apps which may use multiple SPs (e.g. read email and save attachment in a file share service);
i. Determine geographic distribution of unmanaged accesses from specific App/SP; Compare across customers (tenants) in the same or different vertical/geography;
k. Compare across customers (tenants) using the same SP/Mobile operating system (OS);
l. Generate an Alert when any of the above or a combination of the above matches certain conditions or exceeds a configured threshold;
m. Generate pre-canned/custom and periodic or on-demand or event-driven reports on any of a combination of the above parameters; and/or
n. Provide a visualization of these data in a dashboard.

Figure 4:
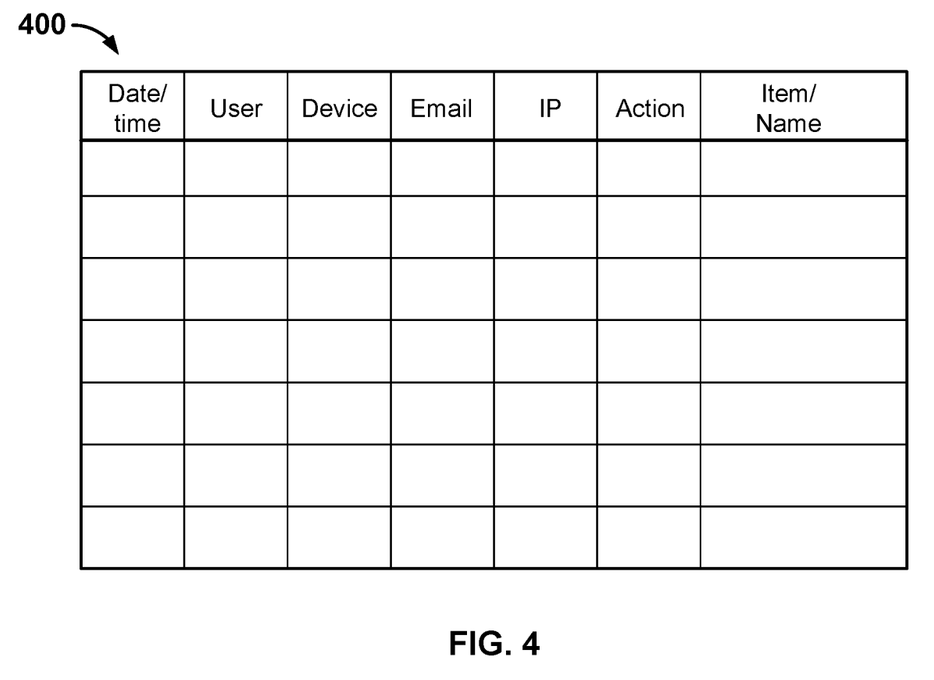
FIG. 4 is a diagram illustrating an example of a cloud service provider audit log in an embodiment of a system to provide secure access to a cloud service.

FIG. 4 is a diagram illustrating an example of a cloud service provider audit log in an embodiment of a system to provide secure access to a cloud service. In the example shown, cloud service provider audit log 400 includes for each access (e.g., login/attempt) or other logged event (e.g., each row) a date/time stamp, a user (e.g., username, display name, etc.) associated with the event, a device type and/or identifier, a user email address, an IP address, an action (e.g., login, used new app to log in, etc.) and an item/name and/or details field that provides further information about the event (e.g., browser or other software used, etc.). In various embodiments, a cloud service provider's audit log may capture a name, bundle ID, and/or other identifier associated with applications used to access the cloud service. Other and/or different information may be captured by different service providers.

Figure 5:
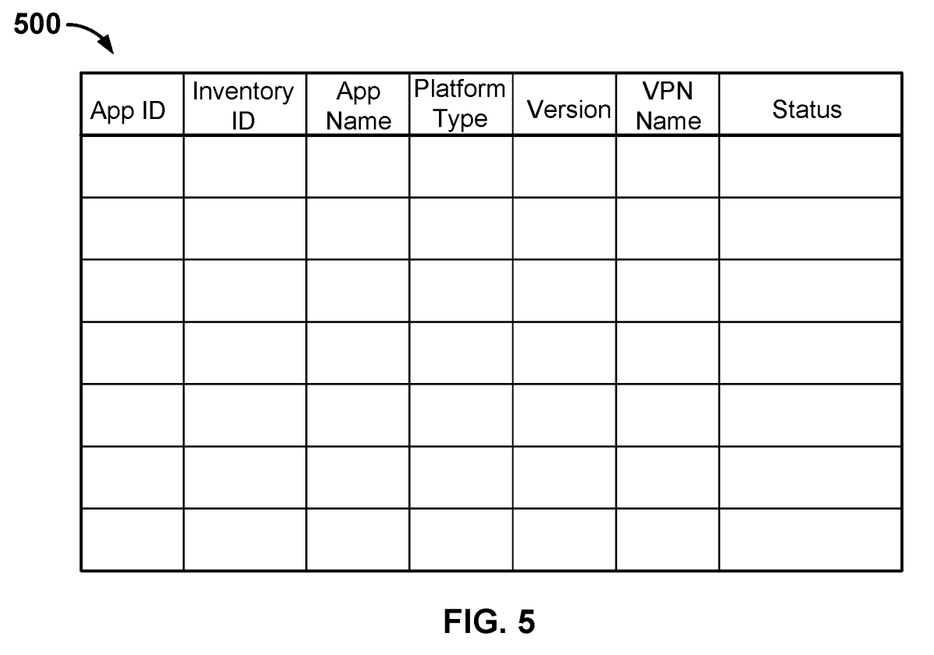
FIG. 5 is a diagram illustrating an example of a mobile device app inventory in an embodiment of a system to provide secure access to a cloud service.

FIG. 5 is a diagram illustrating an example of a mobile device app inventory in an embodiment of a system to provide secure access to a cloud service. In the example shown, mobile device app inventory 500 indicates for each app installed on a mobile device with which an instance of the mobile device app inventory 500 is associated an application identifier (e.g., bundle ID), an inventory ID (e.g., an internal reference), an app name, a platform type (e.g., iOS), an app version, a VPN name (if the app is configured to connect via a VPN) and app status (e.g., managed or unmanaged). In various embodiments, an EMM server, such as EMM server 110 of FIG. 1, is configured to build and maintain an app inventory such as inventory 500 for each managed mobile device. For example, the EMM server 110 may be configured to obtain app inventory information and/or updates periodically from the EMM agent 108 installed on a managed device, such as device 106 of FIG. 1.

In addition to a mobile device app inventory, as shown in FIG. 5, EMM logs and/or reports may include other logs and/or reports, including mobile app data, mobile device data, user data, and access logs associated with accessing a cloud service via a security proxy or other node comprising and/or associated with the EMM solution.

In various embodiments, security risk information generated as disclosed herein may trigger responsive actions of a type and manner determined at least in part by the needs and preferences of a given enterprise.

Figure 6:
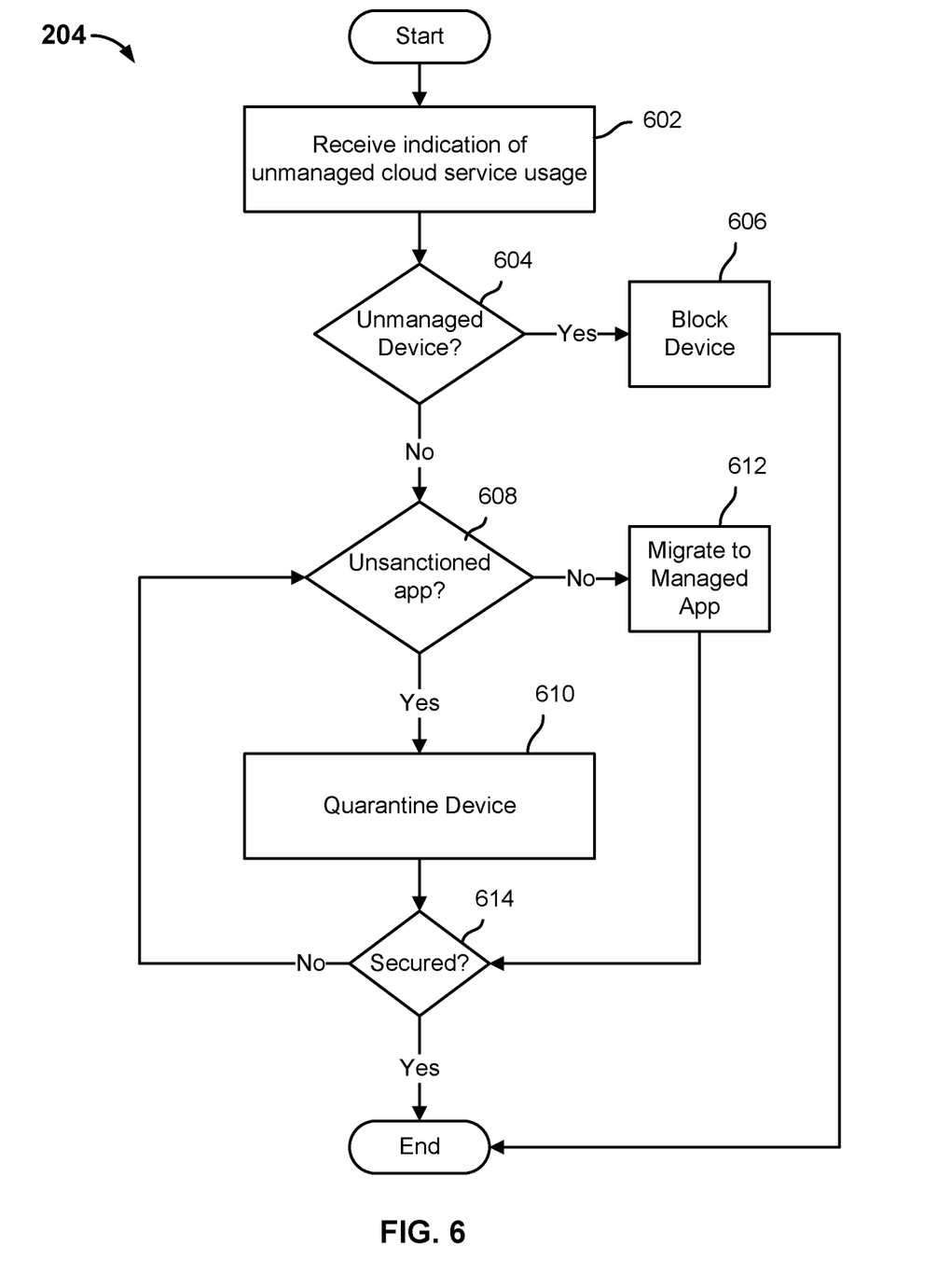
FIG. 6 is a flow chart illustrating an embodiment of a process to provide secure access to a cloud service.

FIG. 6 is a flow chart illustrating an embodiment of a process to provide secure access to a cloud service. In some embodiments, step 204 of the process 200 of FIG. 2 is implemented at least in part by the process of FIG. 6.

In the example shown, an indication of a report or other data indicating unmanaged cloud service usage is received (602). In the case of access by one or more unmanaged device(s) (604), access to the cloud service by that device is blocked (606). If device-based blocking is not available, in some embodiments an associated user may be blocked. If the unmanaged access was other than by an unmanaged device, e.g., access is by one or more unmanaged apps, then for each such app it is determined whether the app is an unsanctioned app (608). For example, third party or other app reputation data may be used to determine the extent or degree of risk. If the app is unsanctioned (608), the associated device(s) is/are quarantined (610) and prevented from accessing the cloud service and/or other enterprise resources unless/until the offending unmanaged app has been uninstalled. If the app is not unsanctioned (608), the user(s) is/are migrated from using the unmanaged app to using instead a managed or otherwise approved app (612). For example, an EMM solution may be used to inform the user to uninstall the offending unmanaged app and download and install the managed app, e.g., from an EMM provider-managed enterprise app store. Once the device(s) has/have been blocked (606) and/or the managed device(s) made secure (610, 612, 614), the process ends.

In various embodiments, analyzed data is used to generate a "risk score" for the deployment. The score may be generated for each cloud service provider used by the enterprise or for the whole company. In various embodiments, the risk score is based on one or more of the following factors, in various combinations:
a. Sensitivity of data in the SP that is subject to leak via the mobile App;
b. Reputation of the applications accessing the SP from Mobile devices;
c. Spread of sanctioned vs. unsanctioned apps accessing the SP;
d. Spread of unmanaged sanctioned app accessing the SP;
e. Spread of unmanaged devices (and hence users) accessing the SP;
f. Role of users accessing the SP using unsanctioned/unmanaged apps/devices;
g. Geographic location of the users/devices accessing the SP using unmanaged devices/apps;
h. Last access time;
i. Life of tokens issued by SP when granting access to users;
j. Type of device used and/or OS version; and/or
k. Type of Industry/Vertical (e.g. regulated versus unregulated may have different bias for exposure of information, apps may be different).

In various embodiments, based on the risk score ranges, generic or specific recommendations can be made for specific SPs, including by way of example one or more of the following:
a. A one-time risk analysis can be done with a free-trial account. This may or may not require an EMM license/report;
b. Based on the risk score, a paid continuous risk assessment service can be bought by the customer; and/or
c. A paid subscription to secure the service from leakage can be bought and risk score can be monitored to validate the return on investment (ROI).

In various embodiments, a Loop Back Engine included in a solution as disclosed herein subscribes to alert events and calibrates itself based on the risk score on a per-SP basis. This engine can be programmed and/or configured to take actions based on specific alerts to take remediation or mitigation actions by calling APIs into the EMM solution and/or the SPs. Examples for remediation or mitigation actions include, without limitation:

a. EMM can be configured to add a policy which can strengthen or relax device posture checks for specific users or groups or devices or location;
   b. SPs can be configured to block users from specific locations, or reduce access level (read-only vs. read-write);
   c. Increase awareness by changing "Acceptable Usage Policy" or add/remove Notifications to specific users/groups; and
   d. Revoking existing login sessions for specific users.

The following example analysis illustrates aspects of techniques disclosed herein, as implemented in various embodiments.

Consider an Enterprise with 1000 users, using 1500 mobile devices. They have 1000 devices under management across 700 users. They are using Box™ as a sanctioned SP for file sharing and collaboration services. The only sanctioned mobile app for Box is the native Box™ application.

Based on the logs collected from EMM, a solution as disclosed herein determines:

1. 500 users under EMM have the official Box™ app.
   2. 100 users have an unsanctioned Box™ app named ShareVault™ from a 3rd party vendor in 125 devices.
   3. 700 devices have the official Box™ app as a managed app and 300 have simply downloaded it from the app store.
   4. 800 devices are iOS and 200 are Android (various versions).
   5. There are 4 executive level users using the unsanctioned ShareVault™ application.

Based on the logs collected from the Box SP logs, the solution determines that:

1. 150 users not in EMM have used official Box app (most likely from an unmanaged mobile device).
   2. 50 users not in EMM have used unsanctioned Box app "ShareVault" app (also most likely from an unmanaged mobile device).
   3. 800 users have logged in from Desktop browsers.
   4. In the last month, the official Box app was used by North-American source IPs to login 300 times.
   5. In the last month, the official Box app was used by non-North-American source IPs to login 70 times.
   6. There are 5 executive level users (out of 10) using the unsanctioned ShareVault application.

In this example, a risk score is assigned based on a well understood model provided by the Open Web Application Security Project (OWASP), to yield the assessment as summarized in the following table:

| Variable | Likelihood (provided by system) | Impact (provided by customer) | Comment |
| --- | --- | --- | --- |
| User or Group | HIGH | HIGH | Over 20% of users using unsanctioned apps and devices. 50% of executive level users in that category. Hence Likelihood is HIGH. Impact is high due to high percentage of exec users. |
| Data in SP | HIGH | HIGH | High exposure to users and devices. |
| User Location | LOW | LOW | Confidential data in Box. <20% access outside NA, medium exposure (Ignoring specific high risk regions in this example). For this corporate, location is not important. |
| Unmanaged App | HIGH | MEDIUM | >20% of devices have official Box App as unmanaged - High Likelihood. The official App is considered secure, but it can be misused by uneducated user. |
| Unsanctioned App | HIGH | HIGH | >15% of devices have unsanctioned ShareVault application - High Likelihood. High impact since the App itself is considered malicious. |
| Consolidated | HIGH | HIGH | |

In some embodiments, a HIGH Likelihood and HIGH Impact results in an overall CRITICAL Risk score.

In various embodiments, action(s) taken in response to security risks identified by correlating cloud service provider audit log or other data with EMM log and/or report data may be implemented at least in part by an EMM solution configured to manage access to the cloud service. For example, managed access to the cloud service may be provided to managed devices and/or apps via a security proxy or other node associated with the EMM solution. In some such embodiments, responsive actions disclosed herein may be taken by or in concert with such a security proxy or other node, as described more fully below.

Figure 7:
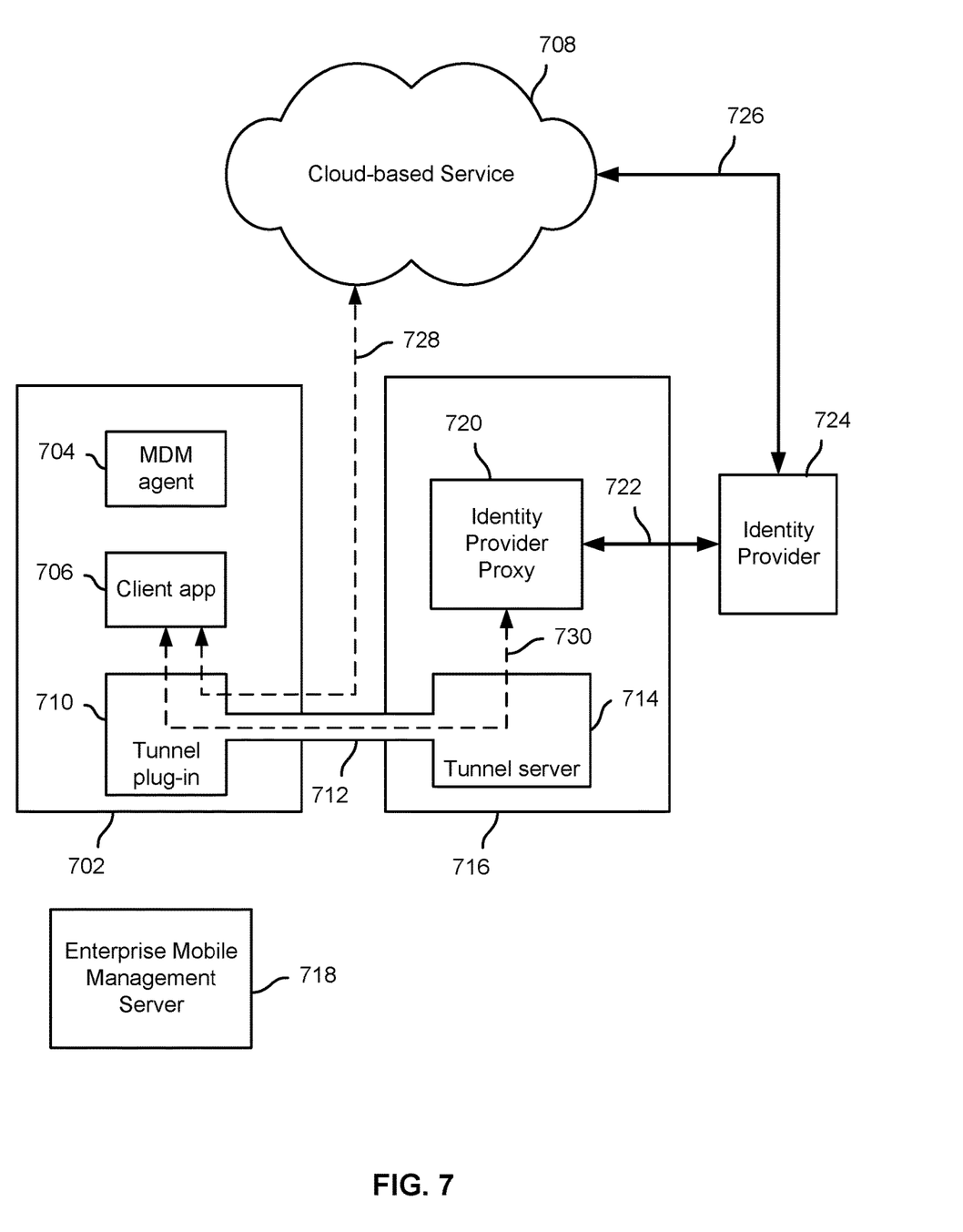
FIG. 7 is a block diagram illustrating an embodiment of a system to provide secure mobile access to a cloud-based service.

FIG. 7 is a block diagram illustrating an embodiment of a system to provide secure mobile access to a cloud-based service. In the example shown, a mobile device 702 includes a mobile device management agent 704. The mobile device management (MDM) agent 704 may include one or both of a native MDM client and/or functionality of a mobile operating system (e.g., iOS, Android) of mobile device 702 and a third party MDM client, agent, and/or app, e.g., one provided by a third party mobility management provider, such as Mobile Iron, Inc. Mobile device 702 has installed thereon a mobile app 706 configured to be used to access a cloud-based service 708. Examples of cloud-based service 708 include, without limitation, cloud-based productivity suites, such as Microsoft® Office 365, and customer relationship management (CRM) and other business applications, such as SAP® and salesforce.Com®. In various embodiments, cloud-based services may be accessed by one or more of a native client application (e.g., a mail application); a third party client app associated with the cloud-based service, e.g., one provided by the service; and a third party client app that is not provide by the service but which can be used and/or configured to access the service.

In the example shown in FIG. 7, a tunnel plug-in 710 has been installed on mobile device 702. In various embodiments, tunnel plug-in 710 may be configured to establish a secure tunnel 712 to a tunnel server 714 running on a security proxy server or other server system 716. In some embodiments, a user of mobile device 702 may register the device, e.g. via an enterprise mobile management (EMM) server 718. EMM server 718 may be configured to configure the mobile device 702 to be managed by EMM server 718 and associated elements, such as security proxy 716. EMM server 718 may be configured to establish MDM control over mobile device 718 via MDM agent 704, such as by causing an associated MDM agent 704 to be installed on the device and/or by configuring a native MDM functionality of mobile device 702. In various embodiments, client app 706 may be brought under management by EMM server 718 and/or MDM agent 704. For example, a configuration profile or other configuration data may be provided to ensure that connection requests and/or other traffic associated with client app 706 is sent via and/or under supervision of tunnel plug-in 710.

In various embodiments, tunnel plug-in 710 may be configured to selectively direct traffic associated with client app 706. For example, tunnel plug-in 710 may be configured to forward traffic addressed by client app 706 to cloud-based service 708 directly to cloud-based service 708, but to send via tunnel 712 traffic addressed to nodes associated with security proxy server 716. In some embodiments, the client app 706 may address all traffic to the service 708, and the mobile or other operating system (e.g., Android®, Microsoft Windows® 10) may be configured (e.g., by the mobile device management server or other MDM authority) to send selected app traffic directly to service 708 and other traffic from the same app only via a tunnel, such as tunnel 712.

In various embodiments, secure tunnel 712 may be established based at least in part on a certificate provisioned to tunnel plug-in 710, e.g., a certificate provide to tunnel plug-in 710 by EMM server 718.

In the example shown in FIG. 7, security proxy 716 includes an Identity Provider (IdP) proxy 720 that is configured to have a "chained IdP" or other trust relationship 722 with a "real" Identity Provider (IdP) 724 associated with cloud-based service 708 via a trust relationship 726. In some embodiments, cloud-based service 708 may be configured to trust (e.g., based on a previously-exchanged certificate, etc.) real IdP 724 but to redirect connection requests received at cloud-based service 708 to IdP Proxy 720 to perform authentication.

Referring further to FIG. 7, in the example shown, client app 706 sends via tunnel plug-in 710 to cloud-based service 708 a request to establish a connection 728 to cloud-based service 708. In various embodiments, mobile device 702 may be configured, e.g., by MDM agent 704 and/or native MDM functionality of mobile device 702, to send via tunnel plug-in 710 connection requests and/or other communications associated with client app 706. In various embodiments, cloud-based service 708 may be configured to redirect to an authentication node connection requests from clients, such as client app 706, that have not yet been authenticated. In some embodiments, the Security Access Markup Language (SAML) standard may be used.

In the example shown, cloud-based service 708 may be configured to redirect connection requests to a URL associated with IdP Proxy 720. Upon being redirected, client app 706 may send a request to establish a connection 730 to IdP Proxy 720, to perform authentication required to gain access to cloud-based service 708. In various embodiments, tunnel plug-in 710 may be configured to recognize the connection request as being associated with IdP Proxy 720, e.g., based on the URL, and may be configured to send connection requests and/or other traffic directed to IdP Proxy 720 only via a secure tunnel, such as tunnel 712. In some embodiments, if the tunnel 712 has not already been established, tunnel plug-in 710 may be configured to establish the secure tunnel in response to the connection request, and to send the connection request via the tunnel once the tunnel has been established.

In various embodiments, a certificate or other security credential and/or information provisioned to tunnel plug-in 710 may be used by tunnel plug-in 710 to establish secure tunnel 712. The certificate or other information may be used by the tunnel server 714, the IdP Proxy 720, and/or other components to authenticate the user and/or mobile device 702. In some embodiments, certificate-based authentication enables authentication to be performed without requiring that the user's enterprise credentials, e.g., username and password, to be entered at or otherwise store on the mobile device 702 and/or disclosed to the cloud-based service 708. In some embodiments, the certificate presented by tunnel plug-in 710 to establish secure tunnel 712 may be used at security proxy server 716 to authenticate the user and mobile device 702. User and/or device information may be associated with the certificate at the security proxy server 716. Security proxy server 716 may have a trust relationship and a direct or indirect (e.g., via another server) connection to an enterprise directory, such as a Microsoft® Active Directory®, and may be configured to obtain user information (e.g., role, region, group or division, etc.) from the directory.

In the example shown in FIG. 7, tunnel server 714 and/or IdP proxy 720 have allowed connection 730 to be established between client app 706 and IdP Proxy 720 via secure tunnel 712. In some embodiments, a device security posture and/or other posture information of mobile device 702 may be checked prior to allowing secure tunnel 712 and/or connection 730 to be established. For example, a compliance check may be performed by querying EMM server 718 to ensure mobile device 702 is and/or remains in compliance. EMM server 718 may be configured to receive information from mobile device 702, e.g., via MDM agent 704, and to make a security or other device compliance posture determination based thereon. For example, if mobile device 702 and/or one or more apps previously under management are no longer under management, or the mobile device 702 has been "jailbroken" or root access obtained or otherwise compromised, or if an unauthorized app has been installed, etc., EMM server 718 may determine the mobile device 702 is no longer in compliance. In various embodiments, one or more of the tunnel plug-in 710, tunnel server 714, IdP Proxy 720, and/or other components may be configured to perform a compliance check regarding mobile device 702.

In some embodiments, a cloud service access policy or other database or status may be checked prior to allowing secure tunnel 712 and/or connection 730 to be established. For example, in some embodiments, security proxy server 716 is configured to enforce access policies in connection with processing requests to access cloud based service 708. For example, in various embodiments, security proxy server 716 may be configured to refuse a request to access cloud based service 708 based at least in part on a determination that a user associated with device 702 and/or app 706 is not (currently) allowed to access the cloud based service 708 and/or the request to access the cloud-based service is associated with an unmanaged app or an app otherwise not authorized to be used to access cloud based service 708.

In various embodiments, connection 730 may be used by client app 706 to obtain from IdP Proxy 720 a SAML assertion or other security token to be used by client app 706 to authenticate itself to cloud-based service 708. IdP Proxy 720 may be configured to obtain from IdP 724 on behalf of client app 706 a security token signed by IdP 724 and therefore trusted by cloud-based service 708. In some embodiments, once authenticated, service-related traffic between client app 706 and cloud-based service 708 may be sent via connection 728.

Figure 8:
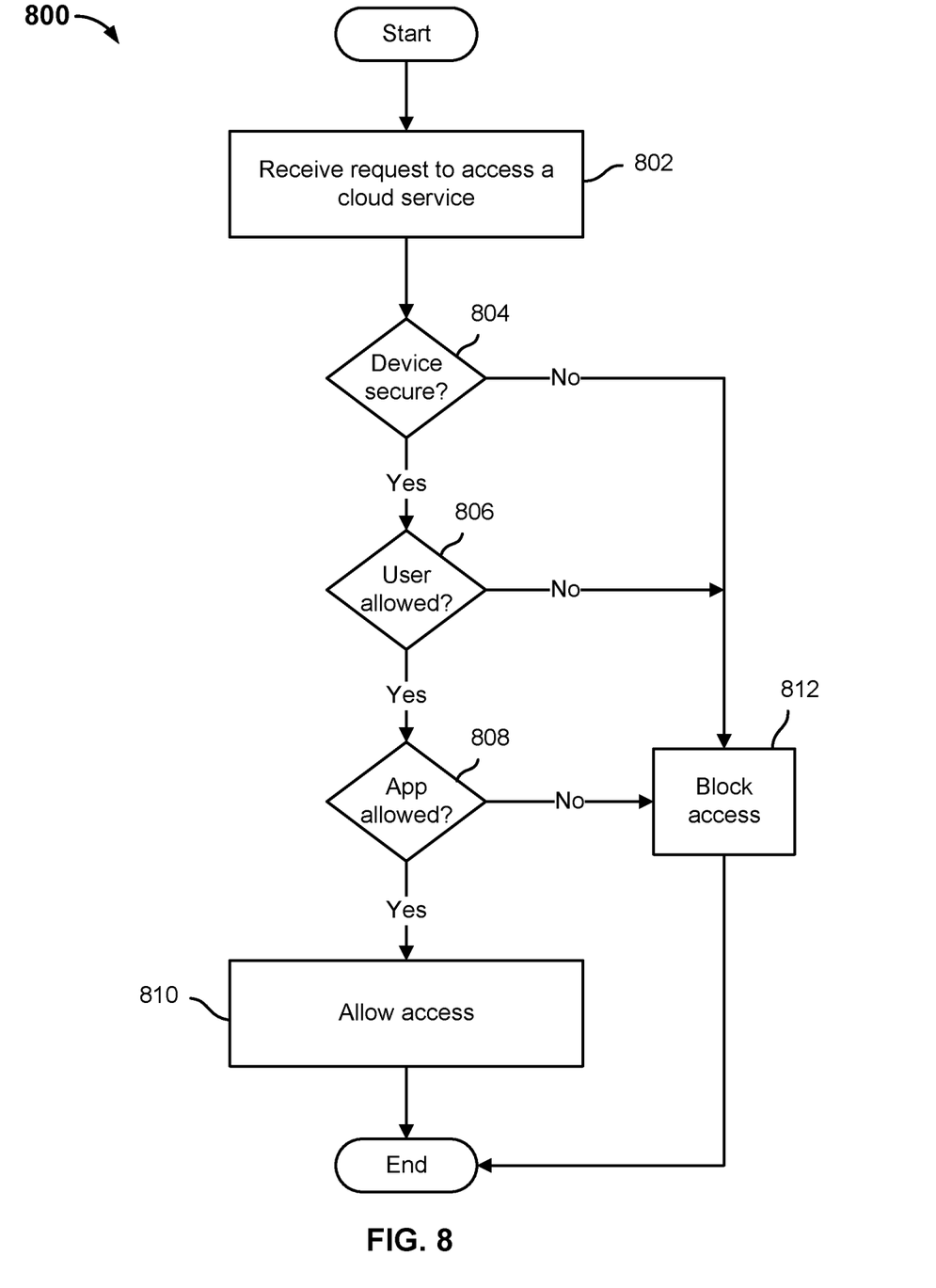
FIG. 8 is a flow chart illustrating an embodiment of a process to provide secure access to a cloud service.

FIG. 8 is a flow chart illustrating an embodiment of a process to provide secure access to a cloud service. In various embodiments, the process 800 of FIG. 8 may be implemented by a security proxy or other EMM-managed access control node, such as security proxy server 716 of FIG. 7. In the example shown, a request to access a cloud-based service is received (802). A device posture check is performed to determine whether the device from which the request was received is in a secure posture/state (804). If the device is secure (804), it is determined whether the user is currently allowed (not blocked) to access the cloud service (806). If so, it is determined whether the request to access the cloud service is associated with an app the user is allowed to use to access the service (e.g., is a managed app, or at least not blocked) (808). If the device, user, and app are all allowed (804, 806, 808), access is allowed (810). For example, access to the cloud service is facilitated as described above in connection with FIG. 7. If the device, user, and/or app are not allowed to access the cloud service (804, 806, 808), access to the cloud service is blocked (812) and the process 800 ends.

Figure 9:
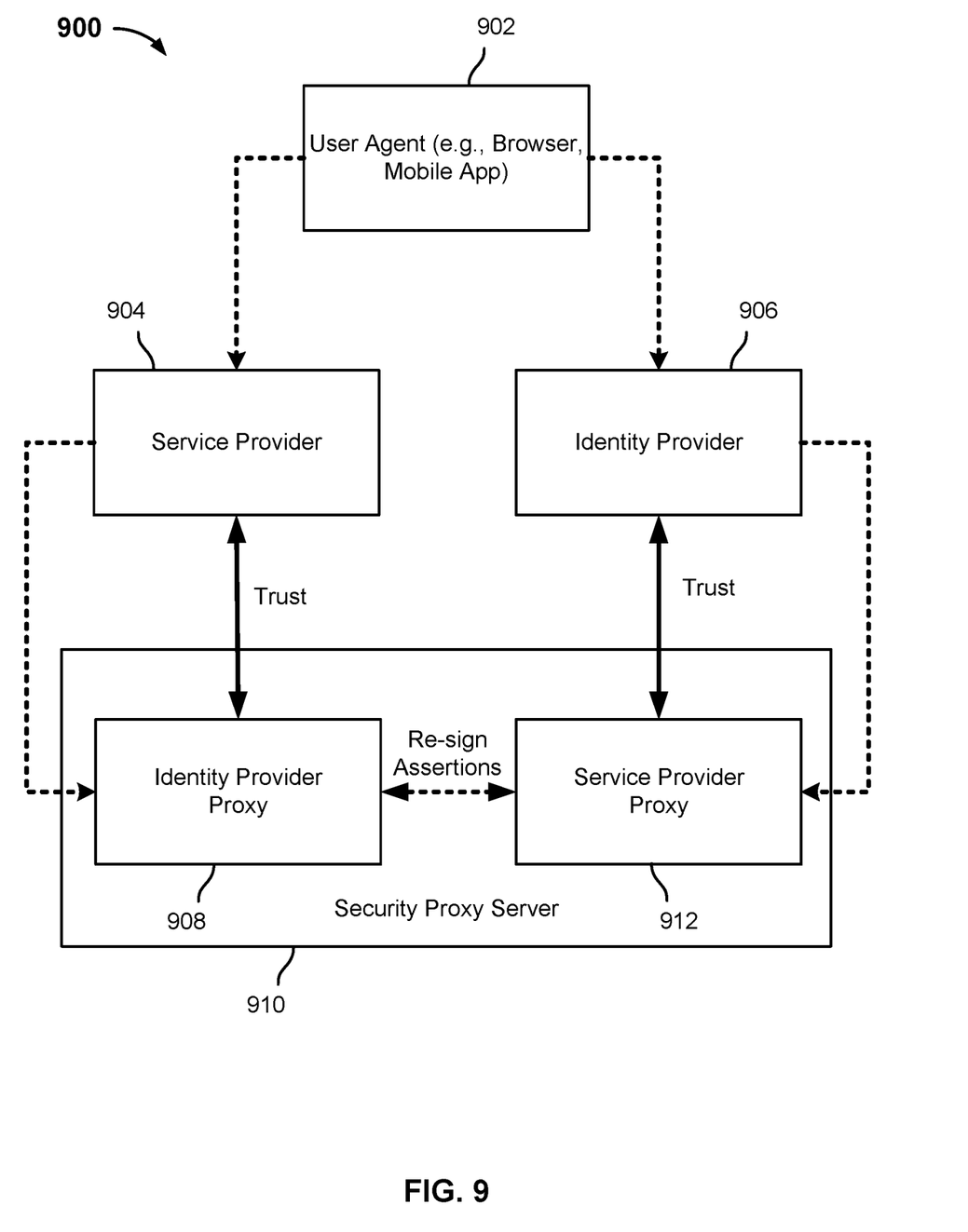
FIG. 9 is a block diagram illustrating an embodiment of a system to provide secure access to a cloud-based service via a delegated identity provider architecture and model.

FIG. 9 is a block diagram illustrating an embodiment of a system to provide secure access to a cloud-based service via a delegated identity provider architecture and model. In various embodiments, techniques disclosed herein are used to detect security risks associated with use of one or more cloud service via unmanaged apps and/or devices, and in some embodiments the system and architecture illustrated by FIG. 9 may be used to enforce a security policy or other action in response to such a security risk. In the example shown, the system and environment 900 includes one or more user agents, represented in FIG. 9 by user agent 902, e.g., without limitation, a browser, managed app, unmanaged app, or other software running on a mobile or other device, configured to be used to access a cloud-based service provided by a service provider 904, e.g., Box.Com™, Dropbox™, or salesforce.Com®. User agent 902 is associated with an identity provider 906, e.g., an on-premises, cloud-based, or other identity provider, such as the PingOne™ service offered by Ping Identity Corporation™. In the example shown, a trust relationship has been established between service provider 904 and identity provider proxy 908 running on security proxy server 910. For example, service provider 904 and identity provider proxy 908 may have exchanged certificates. Similarly, a trust relationship has been established between identity provider 906 and service provider proxy 912, e.g., via exchange of certificates.

Identity provider proxy 908 and service provider proxy 912 have a trust relationship established between them and each has been configured to re-sign assertions on behalf of the other. For example, in various embodiments, identity provider proxy 908 is configured to provide to service provider 904 and/or user agent 902 (e.g., for further presentation to and consumption by identity provider 906) assertions signed by identity provider proxy 908 on behalf of (i.e., acting and appearing as) service provider proxy 912. Similarly, in various embodiments, service provider proxy 912 is configured to provide to identity provider 906 and/or user agent 902 (e.g., for further presentation to and consumption by service provider 904) assertions signed by service provider proxy 912 on behalf of (i.e., acting and appearing as) identity provider proxy 908.

In various embodiments, user agent 902 may initiate access to a service provided by service provider 904 either by first contacting the service provider 904 or by first authenticating with identity provider 906 and then accessing the service provided by service provider 904. For example, user agent 902 may send to service provider 904 a request to access the service. If service provider 904 determines there is no existing (i.e., previously authenticated) session with user agent 902, service provider 904 may be configured to redirect the user agent 902 to identity provider proxy 908, which in turn may redirect the user agent 902 to identity provider 906 via a communication signed by identity provider proxy 908 using a certificate associated with service provider proxy 912. Identity provider 906 may challenge the user agent 902 for credentials, and upon successful login may provide to user agent 902 for presentation to service provider proxy 912 a first (SAML or other) assertion, which service provider proxy 912 may be configured to use to provide to user agent 902 a second (SAML or other) assertion, signed by service provider proxy 912 using a certificate associated with identity provider proxy 908, to be presented to service provider 904 to gain access to the service (or other resource).

In various embodiments, identity provider-initiated authentication may be performed by user agent 902 being used to access and log in via identity provider 906, prior to attempting to access the service associated with service provider 904. Upon successful login, identity provider 906 may provide via a graphical or other user interface presented at user agent 902, e.g., a webpage, a list or other representation of one or more services the authenticated user may access. Selection of a service associated with service provider 904 may result in the identity provider 906 providing to user agent 902 for presentation to service provider proxy 912 a first (SAML or other) assertion, which service provider proxy 912 may be configured to use to provide to user agent 902 a second (SAML or other) assertion, signed by service provider proxy 912 using a certificate associated with identity provider proxy 908, to be presented to service provider 904 to gain access to the service (or other resource).

In various embodiments, a workflow as described above in connection with FIG. 9 may include a step to query (or otherwise obtain from) an EMM server (not shown in FIG. 9) security posture information associated with a managed mobile device. In addition, policy actions with respect to unmanaged devices and/or unmanaged apps, identified as security risks, e.g., based at least in part on cloud service provider audit log data, as disclosed herein, may be enforced at the system and environment 900, e.g., by denying a request to access a cloud service based on a determination the request is associated with an unmanaged app.

FIGS. 7 through 9 describe an exemplary environment in which techniques disclosed herein may be used to provide secure access to one or more cloud services. In the examples shown in FIGS. 7 through 9, responsive actions may be enforced at a security proxy or similar node. In other embodiments, other and/or different architectures may be used to provide and manage access to cloud services, and in each environment responsive actions as disclosed herein may be taken at a node within the applicable architecture and environment at which the responsive action may effectively be taken. For example, some responsive actions may be enforced by one or more of the cloud service, an enterprise IT security administrator, and an identity provider and/or other authentication node used to access the cloud service.

In various embodiments, techniques disclosed herein are used to provide secure access to cloud services, including from employee-owned devices. In various embodiments, application and end point focused risk score provides a unique and differentiated perspective of how mobile applications pose threat to enterprise data in cloud services and also provide mobile specific risk assessment and remediation.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a memory or other data storage device configured to store one or both of enterprise mobility management (EMM) data associated with a set of enterprise users of mobile devices associated with an enterprise and cloud service data associated with use of a cloud service by users associated with the enterprise, wherein the EMM data includes usage data generated by an EMM server and the cloud service data includes usage data generated by a cloud service provider; and
a processor coupled to the memory or other data storage device and configured to:
correlate the EMM data and the cloud service data to analyze usage of the cloud service by said users associated with the enterprise, including one or both of access of the cloud service using one or more unmanaged devices and access of the cloud service using one or more unmanaged mobile apps, wherein correlating the EMM data and the cloud service data includes creating a uniform data scheme by mapping and normalizing the EMM data and the cloud service data;
identify, based on the correlated EMM data and the cloud service data, one or more instances in which one or more users associated with the enterprise accessed the cloud service using an unmanaged device or unmanaged application;
determine an extent of risk to the enterprise associated with at least one of the one or more instances in which one or more users associated with the enterprise accessed the cloud service using an unmanaged device or unmanaged application, wherein the extent of the risk to the enterprise is based at least in part on one or more of (i) a relative use of the unmanaged device compared to use of a managed device to access the cloud service, and (ii) a relative use of the unmanaged application compared to the use of a managed application to access the cloud service; and
in response to identifying one or more instances in which one or more users associated with the enterprise accessed the cloud service using an unmanaged device or unmanaged application, determine an active measure to be performed based at least in part on the determined extent of risk to the enterprise.

2. The system of claim 1, wherein the processor is configured to determine the extent of risk at least in part by determining an extent across the enterprise users of said access of the cloud service using one or more unmanaged devices and access of the cloud service using one or more unmanaged mobile apps.

3. The system of claim 1, wherein the processor is configured to determine the extent of risk at least in part by determining an application reputation score for one or more of said one or more unmanaged apps.

4. The system of claim 1, wherein the processor is configured to determine the extent of risk based on data correlated across multiple cloud service providers.

5. The system of claim 1, wherein the processor is further configured to take a responsive action determined based at least in part on the determined extent of risk.

6. The system of claim 1, wherein the active measure includes blocking the one or more unmanaged devices from accessing the cloud service.

7. The system of claim 6, wherein the blocking the one or more unmanaged devices comprises blocking access to the cloud service by blocking one or more users associated with said one or more unmanaged devices.

8. The system of claim 1, wherein the active measure includes blocking the one or more unmanaged devices from accessing the cloud service.

9. The system of claim 1, wherein the processor is configured to perform one or more of the following with respect to each unmanaged device: quarantine the device, warn the user to use a managed device, and require a further authentication factor.

10. The system of claim 1, wherein the processor is further configured to migrate users of an unmanaged app that is a sanctioned app to use of a managed version of the sanctioned app to access the cloud service.

11. The system of claim 1, wherein the processor is further configured to map said cloud service data to one or more associated mobile apps.

12. The system of claim 1, wherein the processor is further configured to generate a dashboard, report, event, alert, or other output reflecting a level of risk associated with said access of the cloud service using one or more unmanaged devices and access of the cloud service using one or more unmanaged mobile apps.

13. The system of claim 12, wherein the dashboard, report, event, alert, or other output is consumed by a receiving system configured to take action in response to the output.

14. The system of claim 12, wherein the dashboard, report, or other output aggregates risk information by one or more of user, user group, role, sensitivity of enterprise data accessible via the cloud service, unmanaged app, unsanctioned app, and unmanaged device.

15. The system of claim 1, wherein the processor is further configured to assign a risk score to each of a plurality of component risks identified by said analysis of usage of the cloud service and to combine the component risk scores to determine a consolidated risk score.

16. The system of claim 1, wherein the EMM data is received from a plurality of EMM data sources.

17. The system of claim 1, wherein correlating the EMM data includes device and app usage data.

18. The system of claim 1, wherein correlating the EMM data and the cloud service data includes comparing a pattern of usage indicated by the EMM data with a pattern of usage indicated by the cloud service data to determine a level of risk associated with said access of the cloud service using one or more unmanaged devices and access of the cloud service using one or more unmanaged mobile apps.

19. The system of claim 1, wherein:
correlating the EMM data and the cloud service data includes joining and comparing the EMM data and the cloud service data; and mapping and normalizing the EMM data and the cloud service data is based at least in part on at least one of: application knowledge and device knowledge to determine an application granted access to the cloud service.

20. The system of claim 1, wherein:
the active measure comprises blocking a user associated with the at least one of the one more instances of the cloud service being accessed by the unmanaged device or unmanaged application;
the user is associated with a managed device having an EMM agent installed thereon, the EMM agent enforcing one or more security policies associated with the enterprise; and
the blocking the user comprises causing a proxy server via which the cloud service redirects traffic from an application on managed device to refuse a request to access the cloud service.

21. A method of providing secure access to a cloud service, comprising:
receiving enterprise mobility management (EMM) data associated with a set of enterprise users of mobile devices associated with an enterprise, wherein the EMM data includes usage data generated by an EMM server;
receiving cloud service data associated with use of a cloud service of a cloud service provider by users associated with the enterprise, wherein the cloud service data includes usage data generated by the cloud service provider;
correlating the EMM data and the cloud service data, wherein correlating the EMM data and the cloud service data includes creating a uniform data scheme by mapping and normalizing the EMM data and the cloud service data; and
analyzing usage of the cloud service by said users associated with the enterprise, including one or both of access of the cloud service using one or more unmanaged devices and access of the cloud service using one or more unmanaged mobile apps, the analyzing the usage of the clouds service comprising:
identifying, based on the correlated EMM data and the cloud service data, one or more instances in which one or more users associated with the enterprise accessed the cloud service using an unmanaged device or unmanaged application;
determining an extent of risk to the enterprise associated with at least one of the one or more instances in which one or more users associated with the enterprise accessed the cloud service using an unmanaged device or unmanaged application, wherein the extent of the risk to the enterprise is based at least in part on one or more of (i) a relative use of the unmanaged device compared to use of a managed device to access the cloud service, and (ii) a relative use of the unmanaged application compared to the use of a managed application to access the cloud service; and
in response to identifying one or more instances in which one or more users associated with the enterprise accessed the cloud service using an unmanaged device or unmanaged application, determining an active measure to be performed based at least in part on the determined extent of risk to the enterprise.

22. The method of claim 21, further comprising taking action without human intervention in response to said analysis.

23. A computer program product to provide secure access to a cloud service, the computer program product being embodied in a non-transitory computer readable medium and comprising computer instructions for:
receiving enterprise mobility management (EMM) data associated with a set of enterprise users of mobile devices associated with an enterprise, wherein the EMM data includes usage data generated by an EMM server;
receiving cloud service data associated with use of a cloud service of a cloud service provider by users associated with the enterprise, wherein the cloud service data includes usage data generated by a cloud service provider;
correlating the EMM data and the cloud service data, wherein correlating the EMM data and the cloud service data includes creating a uniform data scheme by mapping and normalizing the EMM data and the cloud service data; and
analyzing usage of the cloud service by said users associated with the enterprise, including one or both of access of the cloud service using one or more unmanaged devices and access of the cloud service using one or more unmanaged mobile apps, the analyzing the usage of the clouds service comprising:
identifying, based on the correlated EMM data and the cloud service data, one or more instances in which one or more users associated with the enterprise accessed the cloud service using an unmanaged device or unmanaged application;
determining an extent of risk to the enterprise associated with at least one of the one or more instances in which one or more users associated with the enterprise accessed the cloud service using an unmanaged device or unmanaged application, wherein the extent of the risk to the enterprise is based at least in part on one or more of (i) a relative use of the unmanaged device compared to use of a managed device to access the cloud service, and (ii) a relative use of the unmanaged application compared to the use of a managed application to access the cloud service; and
in response to identifying one or more instances in which one or more users associated with the enterprise accessed the cloud service using an unmanaged device or unmanaged application, determining an active measure to be performed based at least in part on the determined extent of risk to the enterprise.

* * * * *